E. F. NORTHRUP.
FOCUS INDUCTOR FURNACE.
APPLICATION FILED OCT. 9, 1918.

1,378,187.

Patented May 17, 1921.
6 SHEETS—SHEET 1.

INVENTOR
EDWIN F. NORTHRUP
BY
ATTORNEY

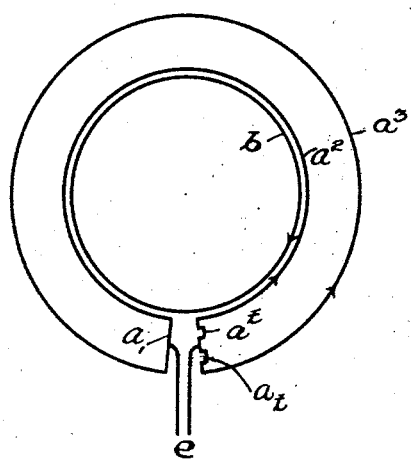
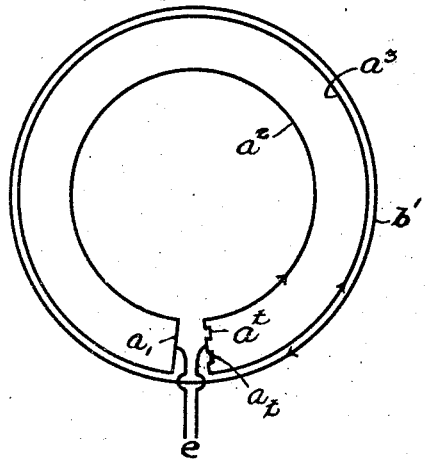
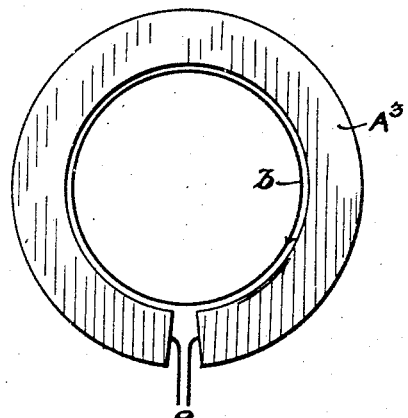
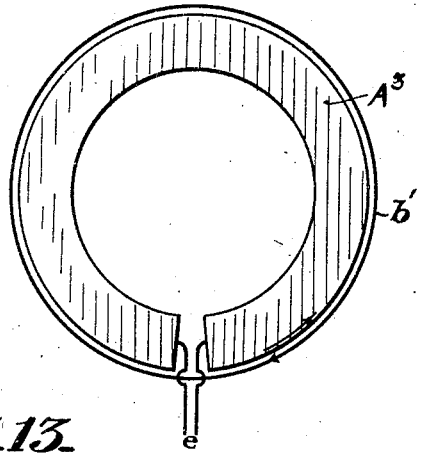
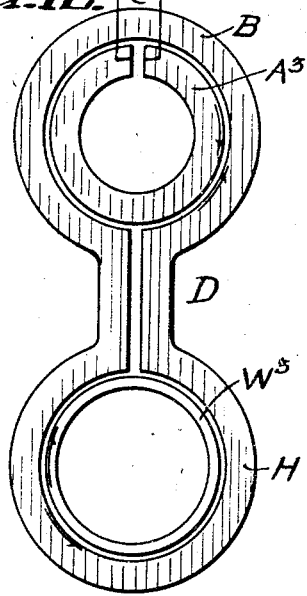
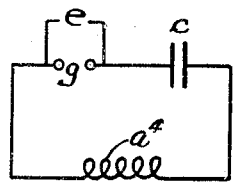
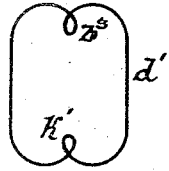

E. F. NORTHRUP.
FOCUS INDUCTOR FURNACE.
APPLICATION FILED OCT. 9, 1918.

1,378,187.

Patented May 17, 1921.

INVENTOR
EDWIN F. NORTHRUP
BY
ATTORNEY

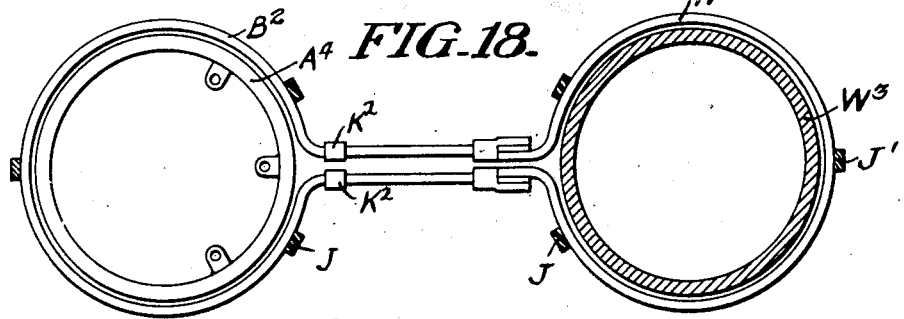
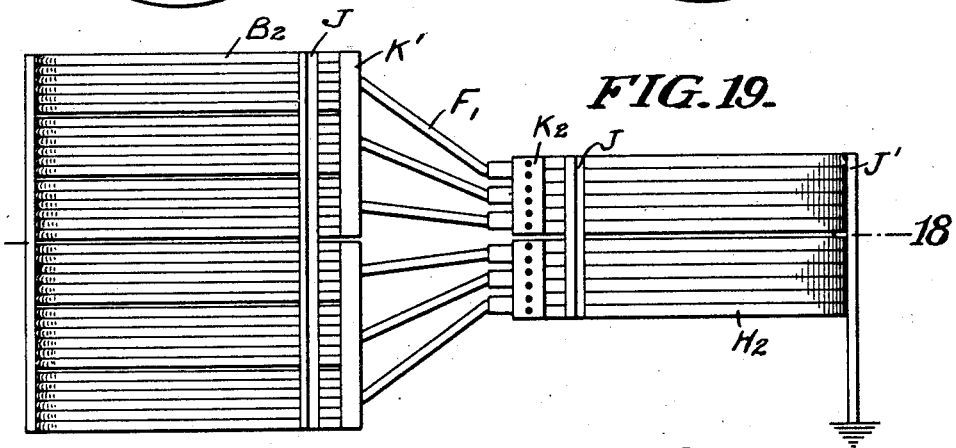
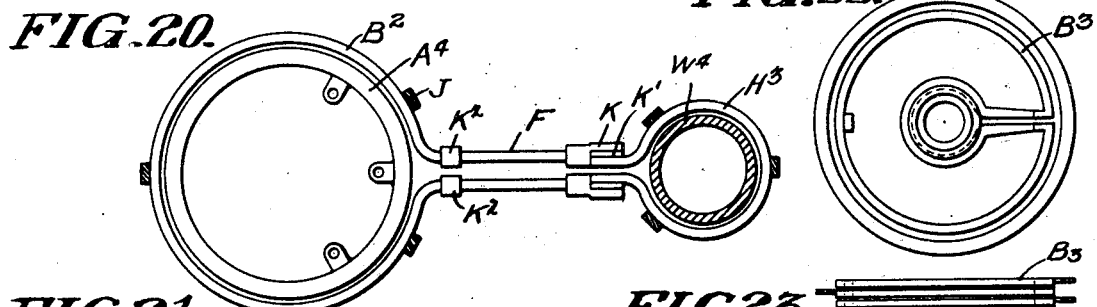
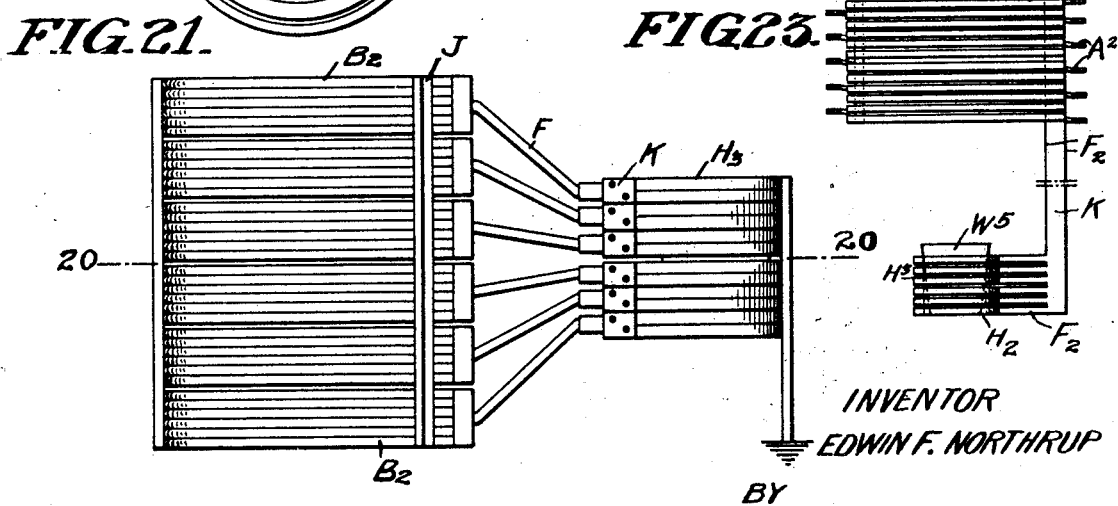

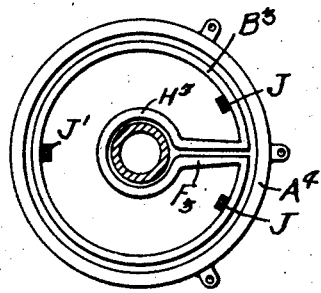
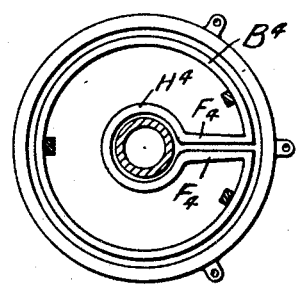
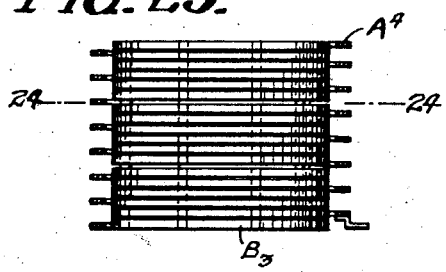
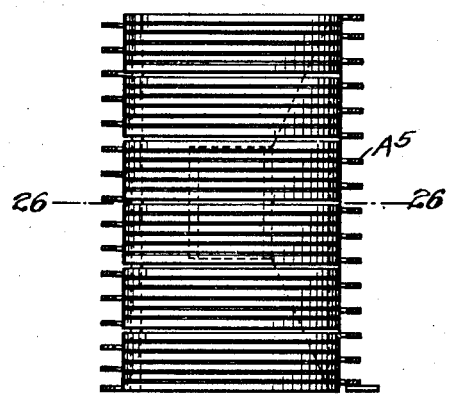
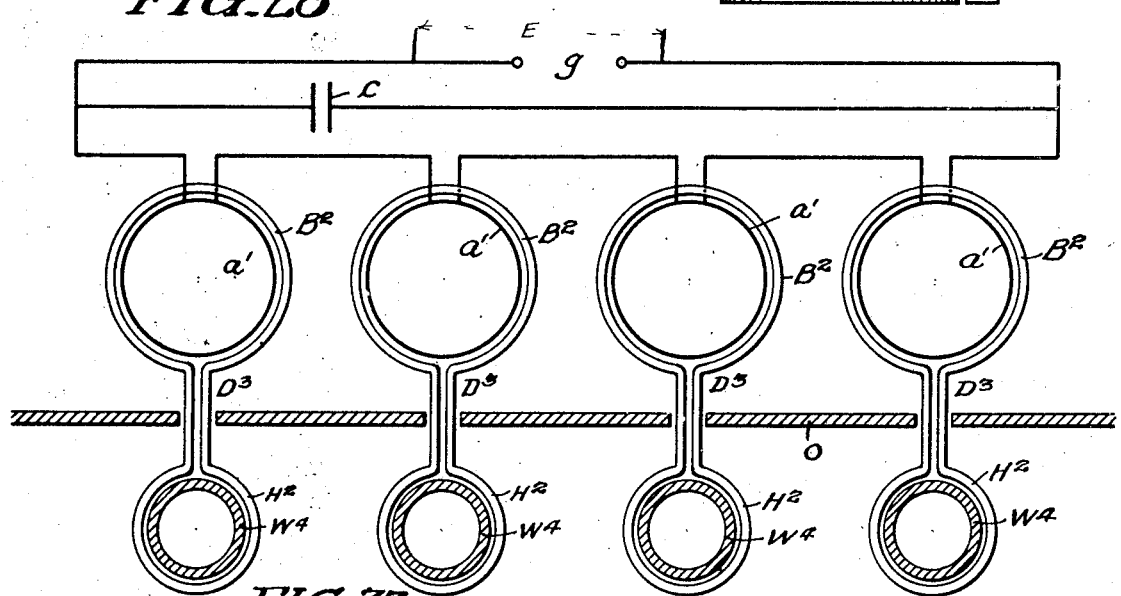
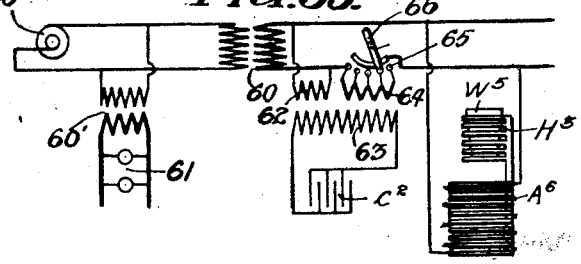

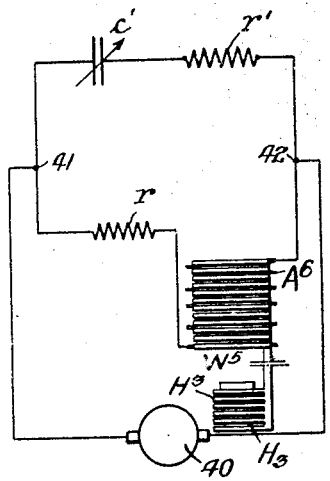
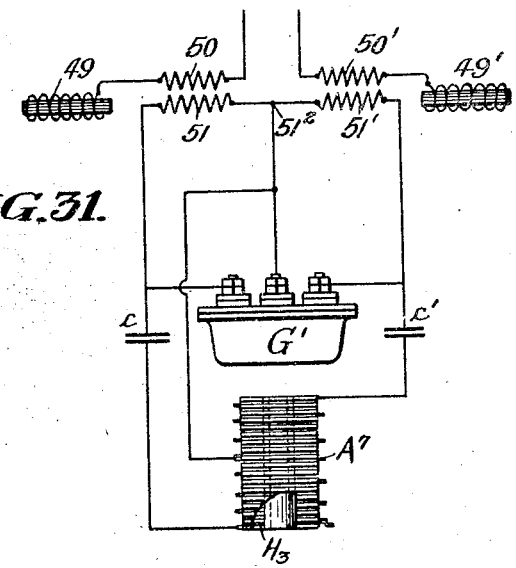
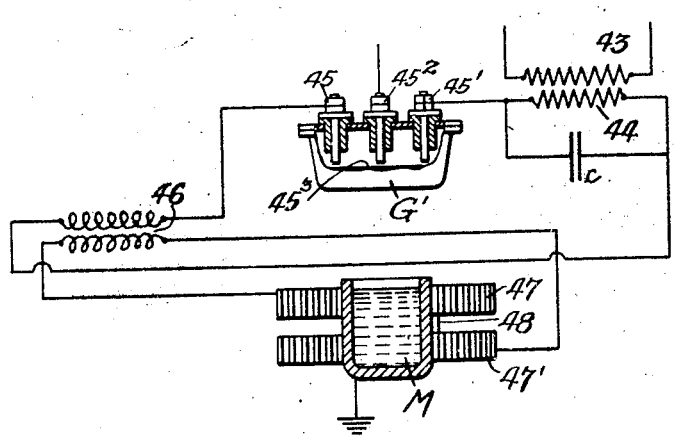
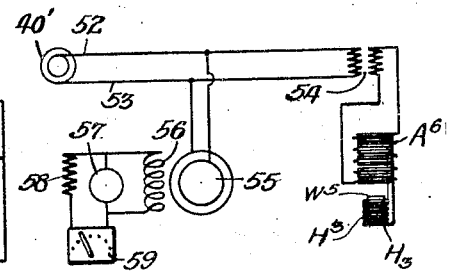

UNITED STATES PATENT OFFICE.

EDWIN FITCH NORTHRUP, OF PRINCETON, NEW JERSEY, ASSIGNOR, BY MESNE ASSIGNMENTS, TO AJAX ELECTROTHERMIC CORPORATION, OF TRENTON, NEW JERSEY, A CORPORATION OF NEW JERSEY.

FOCUS INDUCTOR-FURNACE.

1,378,187.     Specification of Letters Patent.      Patented May 17, 1921.

Application filed October 9, 1918. Serial No. 257,506.

*To all whom it may concern:*

Be it known that I, EDWIN F. NORTHRUP, a citizen of the United States, residing at 30 Wiggins street, Princeton, in the county of Mercer and State of New Jersey, have invented a certain new and useful Focus Inductor-Furnace, of which the following is a specification.

My invention relates to a translating means by which high frequency primary currents in a coil are transformed into electric heating currents within electrically conducting articles or charges to be heated or within an electrically conducting container or other intermediary in heat-transferring relation to it.

From the standpoint of electrical efficiency it is my purpose to effect the transformation from the high voltage of the coil to an inductor at a sufficient distance from the work being heated to permit close coupling under favorable electrical insulation conditions at a moderate temperature and to apply the inductor current to the work, preferably also by induction, at so low a voltage as not to require good insulation and therefore again to permit close coupling.

From the standpoint of insulation it is my purpose to place the main electrical insulation where the heat can be kept moderate and to place the heat insulation where the potentials of transformation are the same or their difference at least moderate.

From the standpoint of safety where it is desired to use high tension circuits, it is my purpose to separate the high tension part of my system from the work being heated so as to avoid danger of workmen coming in contact with the high voltage current, and to ground the connecting parts to avoid danger from leakage of high tension current thereto.

A further purpose is to improve the coupling between a high frequency primary and the work.

One of the purposes of my invention is to focus or concentrate the energy of the inductor upon the work to which it is applied.

A further purpose is to provide for concentration of energy upon the work by any of a variety of means, of which I show two, separately and in combination, the one having the distributing end of the inductor shortened axially and the other having it reduced radially with respect to the receiving end of the inductor.

A further purpose is to provide a double transformation between a high frequency primary coil and the ultimate work, container therefor or heat-transferring intermediary; that with the work and, if desired, both of the transformations being free from whole or partial interlinkage of transformer iron.

A further purpose is to space a high frequency primary and an electrically conducting container, work or intermediary, by a connecting loop, herein termed an inductor, whose "receiving" end forms a secondary to a high frequency coil and whose "transmitting" or "distributing" end supplies electrical energy, preferably inductively, to an electrically conducting material or container.

A further purpose is to simplify the construction of high frequency inductors and avoid the use of special materials.

A further purpose is to adapt an inductor system to high frequency current supply at higher voltages than have previously been practicable, permitting the use of condensers comprising thick glass plates and few metal sheets suited both to higher voltages and to higher frequencies.

My invention resides both in the apparatus and in the processes which I disclose.

Further purposes will appear in the advantages to be obtained from the connections and arrangements shown.

I have preferred to illustrate my invention chiefly diagrammatically and by a few only of a great variety of forms in which it may appear, selecting forms which are both simple and efficient and which at the same time well illustrate the principles of my invention.

Figures 1, 2, 6–13 and 29–33 are diagrammatic views used in the explanation of my invention.

Figure 14:
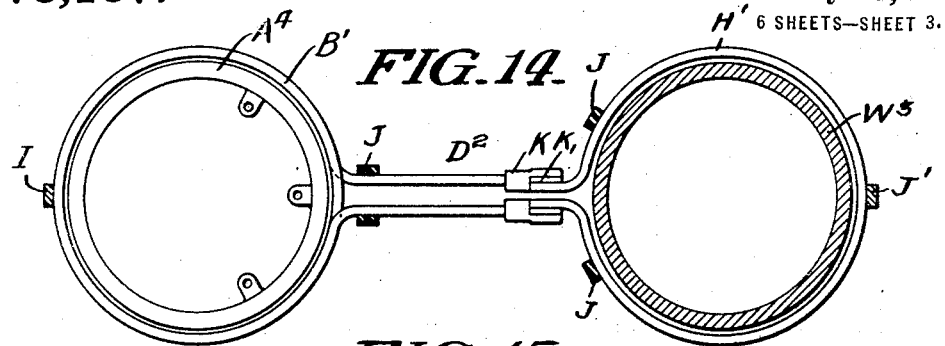
Figure 15:
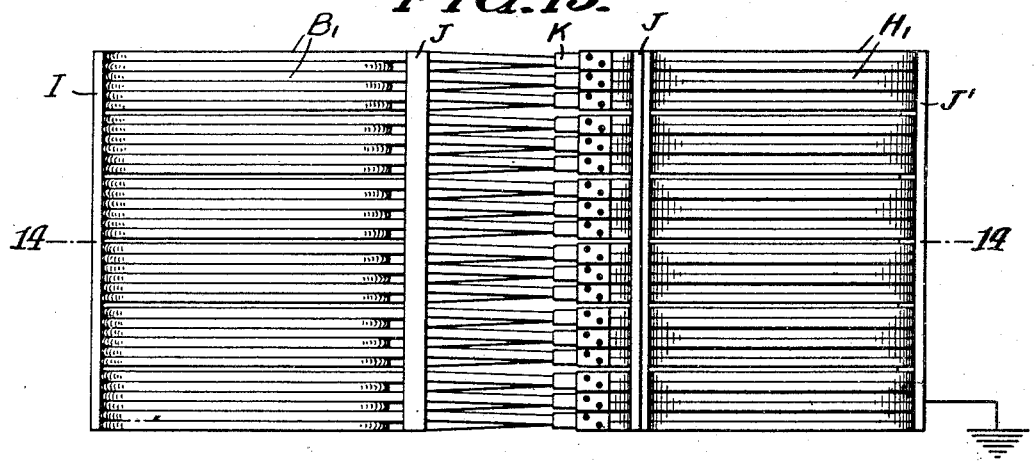
Figure 16:
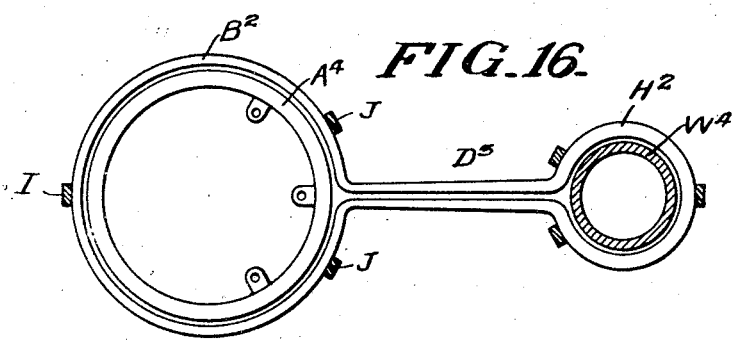
Figure 17:
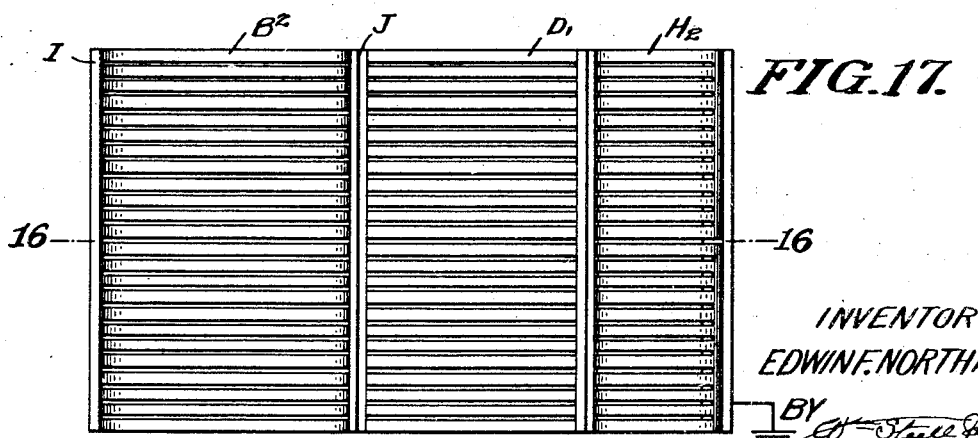

Figs. 14, 16, 18, 20, 24 and 26 are sections upon line 14—14 of Fig. 15; line 16—16 of Fig. 17; line 18—18 of Fig. 19; line 20—20 of Fig. 21; line 24—24 of Fig. 25 and line 26—26 of Fig. 27, respectively.

Figs. 15, 17, 19, 21, 23, 25 and 27 are side elevations of various forms in which my invention may be applied.

Fig. 22 is a top plan view of the structure seen in Fig. 23.

Fig. 28 is a horizontal section with connections showing a further form of my invention.

Similar numerals of reference indicate like parts in the drawings.

My invention has to do with the transfer of electrical energy through the agency of an inductor from an electric circuit to which high frequency and, if desired, also high voltage currents are applied into heat in electrically conducting materials or charges successively heated, or heat-treated, or in electrically conducting containers or heaters in heat-transferring connection with the material finally to be heated.

Since in all of these materials, charges, containers and heaters alike, electric energy is converted into the heat for whose production the system is intended, they are all regarded as the "work" heated or treated and are so referred to, for convenience. Obviously, the form may vary widely, as well as the materials.

Perhaps the most convenient application and the one which best illustrates the interchangeability of different forms is the electric furnace where the heat-developing material (always electrically conducting) may be a ferrous or non-ferrous crucible charge or the crucible itself or even a wholly separate conductor having a higher melting point than the charge and placed within the crucible. Because of this fact and because of the success met with in furnace work I have generally illustrated my invention as applied to a crucible furnace and shall illustrate it chiefly in that connection but with knowledge of many other types of furnace and various uses where there is no furnace and with specific notice that I do not intend to confine or limit it to furnace uses.

In copending applications I have pointed out a variety of ways in which this transfer of electric current into heat can be accomplished by the use of high frequency currents passed through a coil inductively coupled with the work without interlinkage of a ferro-magnetic transformer circuit and hence not requiring the piercing or interruption of the work for this circuit. In all of these the coupling might be regarded as direct, in that the coil was located as close to the work as possible, preferably directly surrounded it, and the work formed the secondary to the high frequency coil as primary.

For many uses the results given by this work-secondary-to-high-frequency-coil-primary proved excellent and this form was sold and successfully used commercially; but for other uses certain objections limited its flexibility and range of application and prevented the fullest development of the principles of my invention. The great difference in potential between the high frequency coil and the work required good electrical insulation where the presence of the highly heated work limited the character of insulation, increased its thickness and reduced its efficiency. Ionization of the air increased the difficulty.

The energy in the coil could not be concentrated as much as was desirable in some cases upon small masses to be heated. There was also danger, perhaps more seeming than real, of injury to workmen by contact with the coil.

My present invention applies high frequency induced current to the work at a distance from the coil, spacing therefrom and forming a coupling, as it were, between the coil and the work whereby the transformation from the primary high frequency coil, previously coupled directly with the work, is by the present invention coupled through what I have preferred to call an "inductor." In its best form a double transformation takes place, the "receiving" end of the inductor forming a secondary to a high frequency primary coil and the opposite, or "distributing" end of the inductor forming a primary to which the work is secondary. The transformations at the work end should be made without interlinkage of transformer iron.

The first transformation takes place at a distance from the heat of the furnace, and hence under temperature conditions greatly favoring electrical insulation and permitting the closest of coupling. The second takes place between an extension of the inductor utilized in the first transformation and the work at a ratio of transformation which may, if desired, be made substantially one to one. The low voltage and substantial freedom from electrical insulation requirements permit a closeness of coupling at this point also, not otherwise attainable by reason of the high temperature.

In other words my present inductor, in its best form, comprises two connected transformer elements, in which there is no need for interlinkage of transformer iron; the one an inductor secondary to the "primary" high frequency coil and the other an inductor primary to which the work is a secondary.

The inductor may be and preferably is made to concentrate or "focus" the energy received from the coil upon the work and is then called by me a "focus" inductor.

The theory upon which my spacing and preferably focus inductor operates and the reasons for the closeness of coupling which I obtain will be best understood from a consideration of some of the conditions of transfer of energy from a high frequency circuit to an adjoining circuit.

Figure 1:
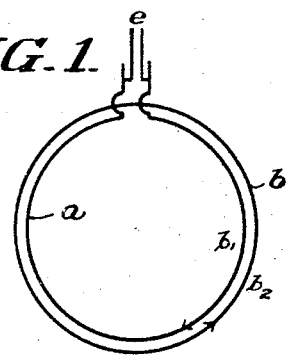

In Fig. 1 a wire primary coil $a$ is shown inside a closed wire secondary coil $b$ and in close inductive relation thereto. The application of a high frequency alternating source of electro-motive force $e$ to its terminals causes a current $i_1$ to pass through the coil which is represented as momentarily passing in the direction of the arrow. Without necessity for interlinkage of iron there will be an induced current, $i_2$ in the closed coil having an opposite direction and of substantially equal value. The coupling here is therefore approximately 100%.

Figure 2:
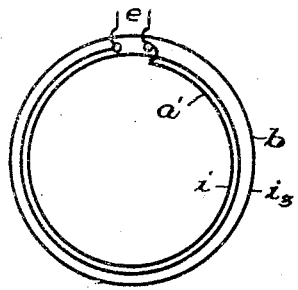

In Fig. 2 I have shown the same arrangement except that one of the coils $a'$ or $b$ comprises a plurality of turns. So far as the number of turns is concerned, the current in $b$ varies directly as the number of turns in $a'$ and inversely as the number of turns in $b$. In the figure shown, the current $i_3$ will be approximately equal to $ni_1=2i_1$.

Various commercial embodiments of the construction shown diagrammatically in Fig. 2 have been shown in my previous applications and two are shown herein to illustrate the capability of use of the same operating coils and sources of current supply shown in illustrating my previous invention but applied to carry out my present invention by using my spacing and focus inductors.

Figure 3:
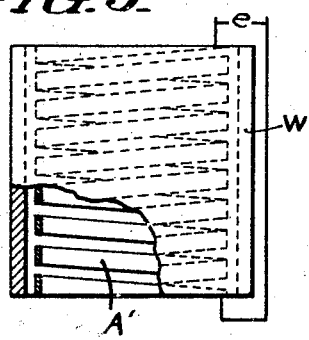
Fig. 3 is a side elevation, partly sectioned, showing structure used in explanation of the theory of my invention.
Figure 4:
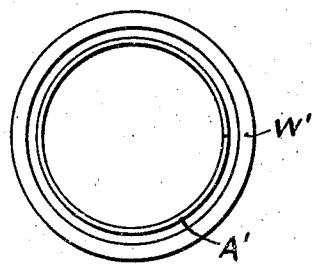
Fig. 4 is a top plan view of the construction seen in Fig. 2.

In Figs. 3 and 4, I show a high frequency coil $A'$ corresponding to the coil $a'$ of Fig. 2, but having a different number of turns and fed from any suitable source of high frequency current shown diagrammatically. The current passing through the $n$ turns of this coil induces a powerful short-circuited current in the single turn or coil of the work to which the heat is to be applied, here represented as a cylinder $W'$.

Figure 5:
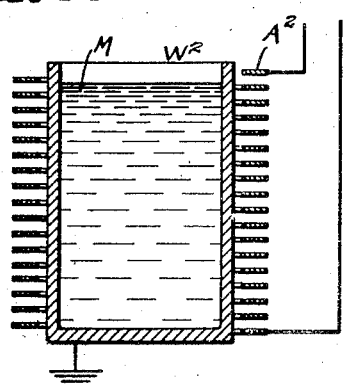
Fig. 5 is a central vertical section, showing appliction of the construction in Fig. 2 to another material.

In the form shown in Fig. 5, high frequency coil $A^2$ of edge-wound wire surrounds the work $W^2$, here shown as comprising either an electrically conducting crucible, or an electrically conducting content $M$ in an electrically non-conducting crucible.

In both of these forms, it will be noted that the preferably high voltage inductor coil is shown in close proximity to the work which is ultimately to be highly heated. In practice the excessive heat affects the electrical insulation conditions so much that considerable separation of the parts is required.

I have observed one very decided characteristic in which the distribution of alternating current differs from the distribution of direct current and which is quite beneficial in the application of my invention.

Whereas in a divided circuit, direct current divides so as to reduce the heating effect of the system in its entirety, if the branches be close together alternating current divided so as to increase the heating effect, $i.$ $e.$, to improve the coupling. This is illustrated by some experiments which I conducted, shown in Figs. 6 to 9 inclusive.

In Figs. 6 and 7 inner and outer wire loops $a^2$, $a^3$ are joined at their ends by conductors $a_1$ to which any alternating current voltage $e$ is applied. Test strips $a^t$, $a_t$ are introduced which, within the intended range, will give visible indication by their color of the comparative temperatures reached.

In the absence of any effect by other conductors inductively related to these loops, the two conductors $a^2$ and $a^3$ will receive approximately equal currents, as seen by the colors of the test strips, and so will be heated to approximately the same extent.

When a closed conducting wire, loop or coil $b$ is placed in close inductive relation to the inner wire loop $a^2$, the current carried by this loop increases greatly and the current carried by the loop $a^3$ is correspondingly reduced.

When, instead, a similar closed conducting wire, loop or coil $b'$ is placed in close inductive relation to the outer conductor $a^3$, instead of to $a^2$, the reverse is true and the current carried by the outer loop $a^3$ immediately increases and that carried by the inner loop $a^2$ decreases. When both loops $b$ and $b'$ are placed in position, the currents carried by $a^2$ and $a^3$ again become approximately equal.

From this it will be seen that current induced in the loop $b$ or $b'$, as the case may be in the opposite direction, reduces the reactance in the adjoining conductor $a^2$ or $a^3$, resulting in an increase in current flow in one or other of these conductors.

Correspondingly, when the conductors $a^2$ and $a^3$ are replaced by an annulus $A^3$, as in Figs. 8 and 9, and alternating current is passed through the annulus by reason of the application of an electromotive force $e$, the location of loops $b$ and $b'$, one at a time, inside or outside of the annulus, results in a corresponding change in distribution of the current flowing through the annulus so as to greatly improve the coupling between.

In Fig. 8, where the loop $b$ is inside the annulus, a large part of the current in the annulus passes through the inner border thereof close to the loop, but with the loop $b'$ outside as in Fig. 9, the greater part of the current passes through the outer border of the annulus close to the loop, as shown by the arrows.

This is true not only of the inducing coil, but in the adjoining conductor, such as represented at $b$ or $b'$, in which the current concentrates along that side or edge of the conductor closest to the inducing loop or coil.

Therefore, in addition to some skin effect, which is present in all distributions of alternating current through conducting masses, there is a very marked tendency of the current so to divide in each of two conductors in inductive relations to each other as to increase the current density in each along that side or border toward the other, greatly increasing the closeness of coupling between the inductively related members.

My present invention is directed primarily to the improvement of the coupling between the inducing coil through which high frequency currents are passed, which I shall call the high frequency coil, and the work, and to improving the insulation conditions. I also make it possible to concentrate or focus the energy from an inducing coil of large surface upon work having a much smaller surface for receiving the induction and of correspondingly small bulk.

Figure 10:
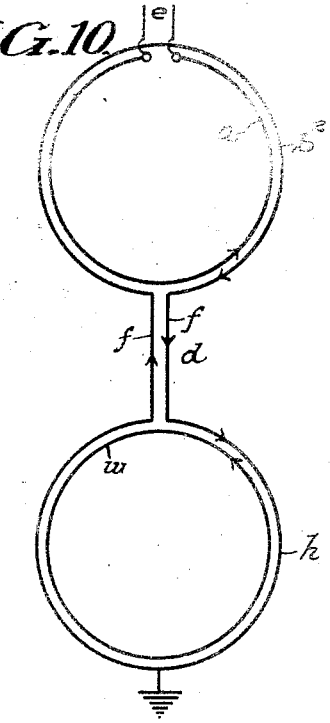

My invention may be illustrated diagrammatically by some such form as that in Fig. 10: however though this contains the spacing feature which I find so advantageous, it is not of focusing form.

In Fig. 10 a high frequency alternating current is applied to the terminals of a coil $a$ causing a flow of current which may be considered momentarily as passing in the direction of the arrow shown thereon. A reversely-directed current is induced in the coil $b^2$.

However, the coil $b^2$ is not there closed, as in the case of coils $b$ and $b'$, but is extended to form what I call a spacing inductor $d$, of which it may be considered the receiving end. Its circuit is completed by connecting neck members $f$ and a distributing coil or end $h$.

At the distributing end, the current passing through the coil $h$, momentarily in the direction shown by the arrow will induce a corresponding reversely-directed current, in the direction of the arrow shown, in the coil $w$ which represents the work in which the energy of the current in coil $a$ is to be converted into heat. At this distributing end since the voltage here is low the coupling may also be made very close and its efficiency quite high, approaching 100%.

Figure 11:
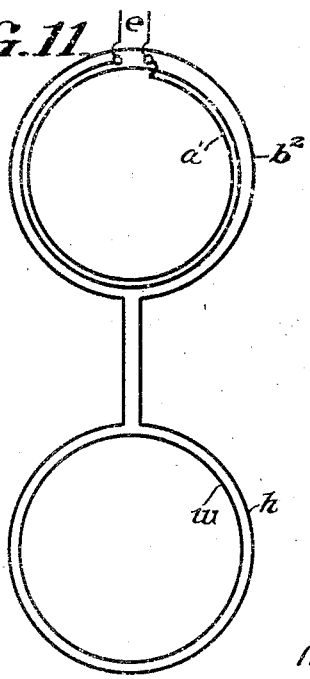

Fig. 11 shows another form of the same connections, differing from Fig. 10 as Fig. 2 is intended to differ from Fig. 1, in the fact only that the coil $a'$ is here shown as having more than one turn, desirably many turns.

In Figs. 10 and 11 it will be evident that the coils $a$ and $b^2$, or $a'$ and $b^2$ may be placed very close to each other and the coupling between may correspondingly be made close, the efficiency approaching 100%, since the work heated is spaced from these coils and insulation between is not complicated by any question of temperature. At this the receiving end of the spacing inductor, high frequency current, whether of high voltage or moderate voltage, may therefore be transformed into low voltage current in the inductor under the most favorable circumstances.

Considering next the distributing end where the inductor delivers its electric energy into electric current in the work, resulting in heat therefor, it will be evident that the conditions for closeness of coupling are also ideal, since the voltage of the inductor may be made so low that electric insulation between the coil $h$ and the work may be ignored and the chief, if not the only insulation be that required for the heat.

It will be evident therefore that the coupling between the high frequency coil and the work may closely approach 100%, giving a maximum of efficiency.

It will be evident also that the inductor $d$ may be grounded without interfering with the efficiency of its operation, protecting fully against injury from leakage of current from the high voltage coil $a$ to the inductor.

Obviously, the high frequency coil $a$ and the receiving inductor coil $b^2$ may bear any relation of number of turns to each other that may prove desirable in the design of the apparatus and the distribution coil $h$ may bear any relation of number of turns to the work $w$ that may be desired, keeping in mind, however, that the benefits of my invention will be greatest both from the standpoint of safety to the workmen and permissible closeness of coupling if the voltage of the inductor be maintained low.

It will also be clear that the distributing coil $h$ will have the same flexibility of application to different kinds and shapes of work and outside, inside or any other inductive relation thereto as would be the case with a high frequency coil symbolized by $a$ or $a'$ ($A'$ or $A^2$ for example).

In Fig. 12 I have shown a form of the inductor designed to illustrate the benefit of the division of the alternating current along the lines of closest coupling and the benefit of this principle in the application of my invention.

As seen from the discussion of Figs. 6–9, the presence of the inductor receiving loop B about the high frequency coil $A^3$ results in a concentration of the inducing current about the outer shell or surface of the coil $A^3$ and of the induced current about the inner shell or surface of the receiving end or coil B of the inductor D. Correspondingly, the presence of the conducting cylinder or crucible, by which the work $W^3$ is here illustrated, within the distributing end or coil H causes a distribution of the induced (now inducing) current within the coil H about its inner shell or surface and of the induced current in the work $W^3$ along its outer shell or surface.

In each case this concentration of current close to the surface greatly reduces the average distance between the lines of travel of the inducing and induced currents, respectively, as compared with the paths which they would travel if they spread uniformly over the several conductors. The coupling is thus tremendously improved for each of the two transformations.

I would particularly point out that my invention is intended for use with high frequency current in which the excessive phase displacement (otherwise caused by the necessarily high reactance) is corrected to the extent desired for the particular installation, by the presence of a condenser, the use of a synchronous converter or other suitable means. This phase adjustment is highly important, both theoretically and practically, and is regarded by me as one of the largest contributing factors in application of this invention successfully upon any extended scale.

Though I purpose filing a separate application directed to this phase correction, I illustrate several forms by which this may be accomplished through the use of condensers or synchronous converters feeding magnetizing current to the line, giving a range from very low to very high voltage, as may be desired and a frequency of thousands of cycles which I consider highly desirable for the purpose.

Some forms of securing high frequencies while maintaining a sufficiently high power factor, notwithstanding the reactance of the circuit, utilize condensers to adjust the phase of the current and to secure a current of large voltage range from the low voltage possible with a generator to thousands of volts. The oscillations secured by these constructions are free as distinguished from those which are forced, and may be damped or undamped as preferred.

In Fig. 13 I show connections of a typical inductor system having transformation at each end of the inductor and supplied with energy from a condenser whose oscillations are damped.

The condenser C is charged from a source of electromotive force $e$ and discharges through an oscillation coil $a^4$ in inductive relation to the receiving coil or coils $b^3$ of an inductor $d'$. The distributing coil or coils $h'$ of the inductor is or are in inductive relation with the work whose electric circuit is indicated at $w'$.

Though the unlaminated character of the work in the case of W' (Figs. 3 and 4) and $W^2$ (Fig. 5) results in free range of eddy currents through the work, considered as a conductor, this is not objectionable because whatever energy is dissipated in eddy currents is converted into heat and this heating of the work is the prime purpose sought. However, in a spacing or focus inductor, large unlaminated masses of the inductor become undesirable on account of the dissipation of the energy in eddy currents within the inductor itself. Heating of the inductor not only represents a loss of the energy so used but is further objectionable because it renders effective insulation more difficult at the receiving end of the inductor and requires undue spacing there. For this reason, it is very desirable to laminate or otherwise subdivide the inductor.

Many ways of laminating will occur to the designer in view of the information herein given and it is not my purpose to attempt to give any more than a suggestion of several ways in which it may be performed. I show stranded conductors whose flexibility makes them easy of adaptation and whose finely divided form makes them ideal for breaking up the stray currents, and also series of superimposed strips or bands which may be cast or bent to shape. The latter are less costly than the stranded conductors and more convenient in some ways by reason of their easy construction and maintained shape.

In Figs. 14 and 15 I have shown a combination of stranded conductors at one end of the inductor and strips or bands at other end thereof, using the strips or bands at the distributing end. The inductor $D^2$ here shown spaces but does not focus.

High frequency coil $A^4$ may evidently be of any type and number of turns and is shown as located inside of the series of superimposed coils forming the receiving end B' of the inductor $D^2$. The individual coils $B_1$ are here shown as comprising two turns each of insulated stranded cable conductor but may evidently comprise a single turn or any other desired, preferably low, number of turns. They are supported at any suitable number of points by insulating standards J which maintain them in position and may be used to space them. The terminals of the coils are joined at some portion in the neck section of the inductor with a series of superimposed coils $H_1$ forming the distribution end H'. These may also be supported and, if necessary, spaced by insulating standards J and it is desirable to have the inductor grounded at some point. This may readily be done by a similar standard J' of conducting material.

I have shown connectors between the stranded cables and the strips at K and have interposed between the connectors and the strips short connecting bars $K_1$ by which two of the strips forming a coil $H_1$ are electrically connected in parallel.

It will be obvious that the relative sizes of the receiving and distributing ends, the characters of the coils there located, the respective axial lengths of the coils, their spacing and the direction of their spacing, whether laterally, axially or radially with respect to the high frequency coil, may all be greatly varied. It will also be evident that the inductor may be coupled with the high frequency coil and with the work, either by placing the coils outside or inside the high frequency coil and work or either one outside and the other inside. I have shown some of the varieties which may be used in order to illustrate this fact, without, however, making any attempt at a complete display of the variety which may exist.

In some uses of my invention it is quite desirable to have the energy delivered by the inductor concentrated effectively or "focused" upon the work, as, for example, by reducing the diameter or axial length of the coil at the work end of the inductor as compared with the coil at the high frequency or oscillation end thereof.

In Figs. 16 and 17 one means of securing this concentration is shown, corresponding generally to Figs. 14 and 15 in that the inductor spaces the work laterally from the high frequency coil.

The inductor is shown as made up of a casting $D_1$, longitudinally kerfed or cut at short intervals to interrupt transverse currents and utilize the uncut portions as supports for the structure. Additional supports J may be supplied if desired or entirely separate strips or sections may be used as preferred.

In this form the current induced by the high frequency coil $A^4$ in receiving coil $B^2$ is concentrated upon or within a relatively small volume of work $W^4$ through the distributing loop $H^2$ of relatively small diameter.

It will be noted that here the general character of strips shown in coils $H_1$ in Figs. 14 and 15 extend uninterruptedly the entire length of the inductor.

In Figs. 18 and 19 I have shown the same general type of construction as in Figs. 14 and 15 in that stranded cables $B_2$ are used for the coils $B^2$ at the receiving end of the inductor but they form sigle turns only and are connected in parallel in groups with bars K' from which conductors $F_1$ lead to groups of coils $H_2$ in multiple. The conductors are united to the coils through sockets and bars $K_2$ as in Figs. 14 and 15.

The coils $H_2$ are of shorter total axial length than the stranded cable coils at the receiving end of the inductor, resulting in a concentration or focusing of the energy axially upon a shorter length and correspondingly smaller volume of work $W^3$.

In Figs. 20 and 21 the coils and connections forming the inductor are of the same character as in Figs. 18 and 19 except that the distributing coils are of smaller radius as well as of shorter total axial length than those at the receiving end, corresponding in this particular to Figs. 16 and 17. Another difference lies in the greater number of groups into which the receiving coils $B_2$ are divided.

The division of the separate coils making up the inductor into parts which are, or may be distinct, as in Figs. 18-21, permits multiphase supply to be used, dividing axially, along the same lines.

In Figs. 22 and 23, I have shown the receiving and distributing ends of the inductor spaced axially. It would, of course, make no difference in the operation whether the high frequency coil and receiving end of the inductor be above or below the distributing end and work. They are shown above. There is the same opportunity here for focusing the energy upon a relatively small volume of work as in the other forms of the invention and I have illustrated this form as of focusing type, connecting the individual coils $B_3$ of the receiving end $B^3$ by means of bars K, in multiple and connecting them by rods $F_2$ with coils $H_2$ which are of shorter total axial length and smaller diameter than the receiving coils $B_3$.

It will be noted that the coils at the receiving end are shown as inside the high frequency coil $A^2$, but could be placed outside, by a very simple rearrangement, as in the other forms, if preferred. The inductor can be grounded as in the other forms.

In Figs. 24-27 the receiving coils $B_3$ are also conveniently placed inside the high frequency coil $A^4$. In both of these forms the distributing end of the focus inductor is smaller in diameter than the receiving end and is coaxial therewith as in the case of Figs. 22 and 23. There is one difference, however, in that the distributing end lies directly within the receiving end in Figs. 24-27 and the spacing might therefore aptly be called radial.

In both of these forms the strips or bands forming the inductor are continuous and radially-directed neck parts $F_3$, $F_4$ connect the coils $B^3$ and $B^4$ with the inner coils $H^3$ and $H^4$.

In the form shown in Figs. 24 and 25 the coils B³ and H³ are axially co-extensive while in Figs. 26 and 27 the coil H⁴ is shorter radially as well as smaller in diameter than the outer (receiving) coil B⁴.

In Fig. 28 I have taken advantage of the spacing of the focus inductor to place the receiving ends thereof where the workmen cannot accidentally come in contact with them. This is done in the illustration by placing them behind a protecting fence, screen or wall O where higher voltage may be safely used upon the high frequency coil and where the coils may be fed in series more safely as shown from a source of current E of much higher voltage, supplying a condenser $c$ which discharges through a gap G.

The distributing ends of the inductors D³ are located upon the exposed side of the protecting wall where the work may be handled freely without danger to the workman.

The importance of the condensers in adjustment of the phase relation between the current and the electro-motive force and in storing all or a part of the charge, including all which discharges through the gap and high frequency coil in one form of my invention, makes any improvement in the condensers of great importance. The tremendous difference in voltage rendered available by this safeguarding of the workman from danger by reason of leakage of the current from the individual high frequency coils and the permissible series arrangement of these coils greatly reduces the number of plates necessary for the condenser and permits the use of thick glass in the condensers, much reducing the expense of the condenser equipment.

A comparison of Figs. 12, 14–21 and 28 with Figs. 3 and 4 shows that any of these inductors having a receiving end of suitable diameter and axial length can be interchanged with the work W' shown in Figs. 3 and 4 to effect spacing and, if desired, also focusing of the energy upon a relatively small mass of work. Except as the type of heat and electrical insulation selected might be rigidly secured to the high frequency coil A' or A² (Figs. 3 and 5) and thus unduly space the receiving end of the inductor radially from the coil the inductor would also be highly efficient when substituted for the work in these figures.

Likewise it will be evident that the inductors shown in Figs. 22–27 could be substituted for the work W² shown in Fig. 5 within high frequency coil A² or placed within coil A' to secure a similar flexibility, whereby the coil is adapted to heat either the work or a spacing and permissibly also focusing inductor.

In Figs. 29–31 I have shown circuit connections taken from my earlier applications (but of which 29 and 31 are modified to show inductors) and new Figs. 32 and 33, indicating different generator circuits with power factor corrections. These are a few only of the many connections by which the inductor feature of my invention may be carried out, and indicate that there may be great variety in this and that the invention is independent of the character and source of current used, provided the current be of high frequency and sufficiently near to being in phase with respect to the electromotive force.

In Fig. 29, I have shown a source of alternating current 40 by which current is supplied to a circuit branching at 41, 42 and including an adjustable excess of capacity, as at $c'$, in one branch and an excess of inductance over the normal inductance of the circuit.

With the connections shown the current in the circuit including the additional capacity and inductance will be much in excess of the current in the generator leads, the difference representing storage of energy in the condensers used and its discharge from them.

The two branches may be tuned or approximately tuned to the frequency of the generator or other source of alternating current supply to give a freely oscillating current. The heating circuit is illustrated by a coil A⁶, which surrounds an inductor as shown. The coil A⁶ supplies a part at least of the inductance of the circuit.

Resistances $r$ and $r'$ are reduced to a minimum in the two branches. The constants are balanced to secure at least approximate tuning of the circuit. Where the mass of the work is changed, with this form, the capacity is adjusted to maintain the balance.

In this circuit the impulses are maintained in amplitude (i. e., undamped) and are continuous, constantly receiving the impulse necessary to take the place of the energy which would otherwise be lost at each vibration. The inductor shown is that of Figs. 22 and 23.

In Figs. 30 and 31, a different form of oscillatory current supply and application are shown in two general examples in which the oscillations are not of uniform amplitude (i. e. are damped) and are not continuous. The inductor shown in Fig. 31 corresponds to that in Figs. 25 and 26.

In Fig. 30 the current is supplied through the primary 43 of an alternating current transformer, whose secondary 44 charges a condenser $c$, and the condenser discharges through a gap G' having two gaps between two of the solid electrodes, 45, 45' 45² and a common electrode 45³ of mercury. The third solid electrode is for multiphase work, but two only are utilized with the connection shown. The discharge gap circuit does not contain the high frequency (oscillation) coil, but is coupled by an ironless transformer 46 with an additional circuit containing reversely connected pancake spirals 47, 47' by which any form of work may be heated. Evidently, the furnace crucible and content shown, to which this is well suited because of the low voltage where the coil lies closest to the work, may be replaced by one of my inductors such, for example as is shown in any of Figs. 22–25 or 31.

The connection of these coils 48 would evidently permit connection of the coils with a two-phase supply such as is shown in Fig. 31.

In Fig. 31 two-phase supply is shown passing through adjustable reactances 49, 49' to transformer primaries 50, 50', from whose secondaries 51, 51' condensers $c$, $c'$ are charged. The condensers discharge through a gap G' of the same character as shown in Fig. 30 except that the middle terminal is here utilized, being connected at the junction $51^2$ of the transformer secondaries. The condensers discharge through a helical form of high frequency coil, shown connected at the middle with $51^2$. For convenience in illustration, the form of focusing inductor of Figs. 24 and 25 is illustrated.

In Fig. 32 I have shown a heating system in which the phase relation between the current and electromotive force is regulated by a synchronous motor operating as a rotary converter.

A single phase alternating current line 52, 53 from a high frequency generator, 40', supplies current through a transformer 54 to the coil $A^6$ of an inductor of the character shown in Figs. 22 and 23.

Connected to the main conductors 52, 53 is a synchronous motor 55, acting as a rotary converter, which is preferably adapted to run on no load or on a light load and which is to supply magnetizing current to the line. For clearness I have omitted starting connections or devices for the motor, considering them sufficiently well known.

The field 56 of this motor is energized by an exciter 57, in circuit with the field 58 of which is a rheostat 59, here shown as hand-operated. Increasing the field excitation of the synchronous motor advances the phase of the current with respect to the electromotive force and improves the power factor, enabling the power factor to be adjusted, within the designed range, by means of the rheostat.

This means of power factor regulation is capable of use on multiphase systems of supply as well as upon single phase systems—better, so far as the convenience of starting is concerned—and may be made automatic. One form of automatic system is found in U. S. Patent No. 872,724 to E. M. Gerry, issued December 3, 1907.

A different means of overcoming the lag or displaced phase relation of the current in an alternating supply circuit, using condensers or equivalent neutralizers of inductance, is shown in Fig. 33.

Here the generator 40' is shown as supplying a heating inductor of the general character shown in Figs. 22 and 23 through one transformer 60 and a non-inductive load 61 through a second transformer 60'. A transformer primary 62 is thrown across the heating circuit, coöperating with a secondary 63 in circuit with a condenser $c^2$ to compensate in a rough way for the lag in current. In order to provide adjustability for the compensation to different needs with variation in conditions in the heating circuit an adjustable transformer primary 64 is provided in series with the heating circuit, and this primary is inductively coupled to the same secondary 63 as the primary 62. Adjustment of the primary 64 is provided by contacts 65 and arm 66 connected with the heating circuit. If desired, the windings may be proportioned so as to give what may be likened to an overcompounding action in a non-inductive circuit; that is, so that the accelerating influences of the condenser on the current shall more than compensate for an increased lag of the current when its strength is increased, whereby the effective potential is raised, as in U. S. patent to Steinmetz, No. 513,370, issued January 23, 1894.

From the illustrations above, it will be evident that my invention does not reside in the manner or mechanism by which the high frequency current is generated or supplied but primarily in the application through an inductor to the work of a current of high enough frequency to render the employment of ferro magnetic transformer interlinkage unnecessary.

Having thus described my invention, what I claim as new and desire to secure by Letters Patent is:

1. In electric heating apparatus, an alternating source of current, a condenser adjusting the phase of the current, a coil supplied with current from said source and a spacing inductor receiving induced current from the coil and distributing the current to the work at a distance from the coil.

2. In electric heating apparatus, an alternating source of current, a condenser adjusting the phase of the current, a coil supplied with current from said source and a laminated spacing inductor receiving induced current from the coil through the laminations in multiple, uniting the currents from the laminations and distributing the current to the work at a distance from the coil.

3. In electric heating apparatus, a high frequency alternating source of current, an ironless transformer whose primary is supplied therefrom and an inductor having one end thereof comprising the secondary of said ironless transformer and the other end spaced from the coil and distributing the induced current to the work.

4. In electric heating apparatus, an alternating source of current, a condenser adjusting the phase of the current, an ironless transformer whose primary is fed from said source of current, an inductor forming the secondary of said transformer at one end and spaced from the coil at the other end and there distributing the current received from the transformation to the work.

5. In electric heating apparatus, a high frequency coil, free from whole or partial interthreading of transformer iron, current supply therefor, and a spacing inductor having one end coaxial with the coil and distributing the current induced therein to the work at the other end.

6. In an electric furnace, an ironless transformer, a free oscillation source of current supply therefor, and an extension of the secondary of said transformer spaced from said secondary and applying the current of said secondary to the work.

7. In electric heating apparatus, a high frequency coil in combination with a spacing inductor having a loop of a single turn at one end in ironless inductive relation with the coil and distributing at the other end to the work at a distance from the coil.

8. In electric heating apparatus, a coil and a source of high tension, high frequency current therefor, in combination with a low tension spacing inductor having one end coaxial with the coil, receiving current from it and distributing it to the work at the other end.

9. In an electric furnace, a coil and a source of high frequency current therefor, in combination with a spacing inductor having a loop at one end receiving induction from the coil and a conducting crucible at the opposite end to which the inductor is adapted to supply current.

10. In an electric furnace, a coil and a source of high frequency current therefor, in combination with an inductor having a receiving end concentric with the coil and in ironless inductive relation with the coil, the inductor distributing the current to the work at a distance from the coil.

11. In an electric furnace, a coil and a source of oscillation current therefor, in combination with an inductor comprising a number of parts in multiple to avoid eddy currents and which are at one end coupled with the oscillation coil, said inductor distributing the current received to the work at the other end.

12. In electric heating, a source of high voltage, high frequency current, a coil connected therewith and a low tension inductor, coupling the coil with electrically conducting work spaced therefrom.

13. In electric heating apparatus, a source of high frequency current and a coil connected therewith, in combination with a spacing inductor having one end in inductive relation with the coil and the other end spaced therefrom and in inductive relation with electrically conducting work.

14. In electric heating apparatus, a high voltage, high frequency source of current and a coil connected therewith, in combination with a low voltage spacing inductor having one end in inductive relation with the coil and the other end spaced therefrom and in inductive relation with electrically conducting work.

15. In electric heating apparatus, a coil and a source of high frequency current therefor, in combination with a plurality of receiving and distributing inductor parts, in inductive relation with said coil and with electrically conducting work.

16. In electric heating apparatus, a coil, a source of high frequency current therefor, an inductor having one end in inductive relation thereto, the coil having many times as many turns as the end of the inductor, a connecting portion of the inductor and a distributing inductor end in inductive relation to the work.

17. In electric heating apparatus, a coil and a source of high frequency current therefor, in combination with a spacing inductor in inductive relation with the coil at one end and with the work at the other and laminated at the ends.

18. In electric heating apparatus, a coil and a source of high frequency current therefor, in combination with a spacing inductor in inductive relation with the coil at one end and with the work at the other, laminated at the ends and with laminated parts connected in multiple.

19. In electric heating, a coil and a source of high frequency current therefor, in combination with a plurality of groups of receiving coils in inductive relation therewith and distributing coils connected with the groups and in inductive relation with the work.

20. In an electric furnace, a coil, a source of freely oscillating current therefor, an inductor adapted at one end to lie in close inductive relation with the coil and at the other to lie in close inductive relation to the work and divided at one end in planes perpendicular to the axis of the coil to prevent eddy currents.

21. In electric heating apparatus, a coil and a cource of high frequency current therefor, in combination with an inductor comprising spaced ends in inductive relation respectively with the coil and with the work, one at least of the ends being made up of stranded cable conductor.

22. In electric heating apparatus, a source of high frequency current of high voltage, a coil through which the current is passed, a low voltage inductor having one end in inductive relation to the coil and the other end spaced therefrom and supplying current for the work and a grounded connection for the inductor circuit.

23. In electric heating apparatus, a source of high frequency current of high voltage, a coil through which the current is passed, a low voltage inductor having one end in inductive relation to the coil and the other end in inductive relation with the work and a grounded connection for the inductor.

24. In electric heating apparatus, a coil and a source of high frequency current therefor, in combination with an inductor having opposite ends of circular section, in inductive relation respectively with the coil and the work, having the inductive part at the work end laterally separated from the coil end and the coupling with the work free from interlinkage with a ferro-magnetic transformer circuit.

25. An induction coil, a supply of high frequency current therefor, an inductor having one member coaxial with the coil and free from interlinkage of transformer iron therewith, a distributing end applying the induction to the work and a neck connected therebetween.

26. A pair of spaced coils, a high frequency source of current inductively coupled with one of the coils, the coupling being free from interlinkage with transformer iron and connections between the pair of coils to energize one from the induction received by the other.

27. An induction coil, in combination with an inductor adapted to fit therein and comprising coaxial, inductive receiving and distributing ends and connecting neck parts therefor.

28. A coil adapted to receive high frequency currents, in combination with an inductor having circular, laminated, coaxial ends, one being in inductive relation with the coil, and neck pieces joining the ends.

29. In electric heating apparatus, a coil for inductively receiving and distributing electric energy comprising coaxial turns adapted to coöperate with the primary of a transformer and with the work respectively.

30. In an electric furnace, a coil, a source of high frequency current therefor and an inductor having receiving and distributing ends, one of them located above the other and the receiving end forming a secondary for the coil.

31. In an electric furnace, a coil, a source of high frequency current therefor and an indicator having receiving and distributing ends, one of them located above the other and the receiving end forming a secondary for the coil, and fitting within the coil.

32. In electric heat-receiving apparatus, a receiving coil adapted to coöperate with a transformer primary and having its ends inwardly turned, in combination with a distributing coil coaxial with and lying within the receiving coil and connected in series with the receiving coil.

33. In electric heating apparatus, coaxial coils of different diameter connected in series and comprising a single effective turn each.

34. In electric heating apparatus, coaxial coils of different diameter connected in series, so connected that the current passes through them in opposite directions and spaced to effectively reduce mutual induction.

35. In electric heating apparatus, a coil for inductively receiving and distributing electric energy, comprising coaxial turns adapted to coöperate with the primary of a transformer and with the work respectively and of different diameter.

36. In electric heating apparatus, coaxial coils of markedly different diameter connected in series and forming parts of different transformer units.

37. In electric heating apparatus, coaxial coils of markedly different diameter connected in series and free from interlinkage of transformer iron.

38. In electric heating apparatus, coaxial coils of different axial length connected in series.

39. In electric heating apparatus, coaxial coils in series forming parts of different transformer units and having markedly different effective surfaces.

40. In an electric furnace, a coil and a source of high frequency current supply, in combination with an inductor having a receiving end in inductive relation with the coil and a distributing end in inductive relation to the work, located coaxially of the receiving end and at a distance along the axis therefrom, and connections between the two ends.

41. In electric heating apparatus, a coil and a source of high frequency current supply, in combination with a focus inductor having its receiving end in inductive relation with the coil and its distributing end concentrating the current received about a surface of the work markedly smaller than the effective inductive surface of the receiving end.

42. In electric heating apparatus, a coil and a source of high frequency current therefor, in combination with an inductor having opposite ends in inductive relation respectively with the coil and the work and having the inductive part at the end of shorter axial length than at the coil end.

43. In electric heating apparatus, a coil and a source of high frequency current therefor, in combination with a focus inductor having spaced ends in inductive relation to the coil and work respectively and the work end of smaller effective diameter than the coil.

44. In an electric furnace, a coil, a source of high frequency current therefor and having an inductor receiving and distributing ends, one of them located above the other and the receiving end forming a secondary for the coil and having connections between the two ends, the distributing end being of smaller effective inductive cylindrical surface than the receiving end thereof.

45. In electric heating, a coil and a source of high frequency current therefor, in combination with a laminated focus inductor receiving current from the coil at one end and distributing it at the other end, the latter having a smaller inducing surface than that presented by the coil.

46. In an electric furnace, a coil and a source of high frequency current therefor, in combination with an inductor having a single turn at its receiving end in inductive relation to the coil, a distributing end comprising a single turn adapted to surround the work and free from interlinkage of magnetizable transformer material, and neck connecting parts between the two ends.

47. A plurality of coils connected in series and a source of high frequency current therefor, in combination with separate inductors from said coils comprising, each, a receiving end in inductive relation with the coil and a distributing end at a distance therefrom and in inductive relation with the work.

48. A plurality of coils connected in series and a source of high frequency current therefor, in combination with separate inductors from said coils comprising, each, a receiving end in inductive relation with the coil and a distributing end at a distance therefrom adapted to supply current to the work.

49. In electric heating apparatus, a coil, a source of high frequency current therefor of high voltage, a spacing protector in front of said coil and an inductor having a receiving end in inductive relation with the coil, lcoated on one side of the protector and a distributing end for heating the work, located on the opposite side thereof.

50. In electric heating apparatus, a coil, a source of high voltage high frequency current therefor, a spacing protector, and an inductor having a receiving end in inductive relation with the coil, located on one side of the protector and having a distributing end in inductive relation with the work, located on the opposite side thereof.

51. In electric heating apparatus, a coil, a source of high voltage, high frequency current therefor, a spacing protector and a focus inductor having a receiving end in inductive relation with the coil, located on one side of the protector and having a distributing end of smaller effective inductive surface than the coil inductively coupled with the work and located upon the opposite side thereof.

52. In an electric heating apparatus, a primary coil and a source of high frequency current therefor, in combination with a grounded spacing inductor having inductive relation with the said primary coil at one end and with the work at the other.

53. The process of safeguarding the use of a high frequency coil for inducing current in electrically-conducting work without interlinkage of a ferro magnetic transformer circuit therewith, which consists in spacing the work from the coil and connecting the two by an inductor performing the functions of a secondary to the coil and, without interlinkage of a ferro-magnetic transformer circuit, of a primary to the work as secondary.

54. The process of improving the closeness of coupling between a high voltage coil and work coupled therewith, free from interlinkage of a ferro-magnetic transformer circuit, which consists in removing the work far enough from the coil to prevent undue heating of the latter, connecting by an inductor of low voltage, thus freeing the insulation between the high voltage coil and the inductor from complication by excessive heat and coupling the inductor with the work inductively, at the low voltage, free from interlinkage with a ferro-magnetic transformer circuit, thus freeing the coupling from insulation requirements.

55. The process of protecting the work and workmen from leakage of high voltage current in transposing the energy of a high voltage, high frequency current passed through a coil into heat in the work, which consists in spacing the coil and work from each other, changing the high voltage of the coil into low voltage of an inductor at a point of relatively low temperature and in changing the low voltage inductor current into current in the work at the point of high temperature and in mechanically separating the high frequency coil side of the inductor from possible interference by the workmen.

56. The process of protecting the work and workmen from leakage of high voltage current in transposing the energy of a high frequency current passed through a coil into heat in the work heated, which consists in changing the high voltage fed to the coil into low voltage of an inductor at a point of relatively low temperature and in changing the low voltage inductor current into current in the work at a point of high temperature spaced therefrom and in grounding the inductor.

57. The process of focusing the energy of a current of high frequency within a coil upon a relatively small mass of work to be heated, which consists in interposing an inductor having a relatively large surface to receive the induction from the coil and a relatively small surface to distribute the induction to the work.

58. The process of concentrating the induction of a current of high frequency within a coil upon the work, which consists in coupling the coil to one end of an inductor, forming the other end of the inductor of smaller effective inductive surface as a primary and coupling it with electrically-conducting work to induce the energy in a relatively small mass of work.

59. The process of focusing the energy of a freely oscillating current within a coil upon work to be heated, which consists in connecting the coil with the work by an inductor in inductive relations with both and having a smaller effective inductive surface in the portion inductively connected with the work than the effective inductive surface of the coil.

60. The process of focusing the energy of a current of high frequency within a coil upon work to be heated, which consists in connecting the coil with the work by an inductor performing secondary functions to the coil as primary at one end and primary functions to the work as secondary at the other end and having shorter axial length at the work end than the axial length of the coil.

61. The process of focusing the energy of a current of high frequency within a coil upon a relatively small mass of electrically-conducting work, which consists in coupling the coil to the work by an inductor having inductive relation with both and of smaller diameter at the work end than the diameter of the coil.

62. The process of focusing the energy of a current of high frequency within a coil upon a relatively small mass of electrically-conducting work which consists in coupling the coil to the work by an inductor having inductive relation with both and of shorter axial length and smaller diameter at the work end than the axial length and diameter of the coil.

EDWIN FITCH NORTHRUP.